(12) United States Patent
Taniguro et al.

(10) Patent No.: US 11,542,436 B2
(45) Date of Patent: Jan. 3, 2023

(54) BIOMASS TREATMENT METHOD

(71) Applicant: Katsumori Taniguro, Nasushiobara (JP)

(72) Inventors: Katsumori Taniguro, Nasushiobara (JP); Kazunori Iwabuchi, Sapporo (JP); Takanori Itoh, Sapporo (JP); Kumpei Ota, Sapporo (JP)

(73) Assignee: Katsumori Taniguro, Nasushiobara (JP)

( * ) Notice: Subject to any disclaimer, the term of this patent is extended or adjusted under 35 U.S.C. 154(b) by 0 days.

(21) Appl. No.: 16/185,061

(22) Filed: Nov. 9, 2018

(65) Prior Publication Data

US 2019/0093018 A1 Mar. 28, 2019

Related U.S. Application Data

(63) Continuation-in-part of application No. PCT/JP2017/003383, filed on Jan. 31, 2017.

(30) Foreign Application Priority Data

May 11, 2016 (JP) .............................. JP2016-095471

(51) Int. Cl.
*C05F 17/60* (2020.01)
*C10B 49/02* (2006.01)
(Continued)

(52) U.S. Cl.
CPC ................ *C10B 49/02* (2013.01); *B09B 3/00* (2013.01); *C01B 32/90* (2017.08); *C02F 11/10* (2013.01);
(Continued)

(58) Field of Classification Search
CPC ..... Y02W 30/40; Y02W 30/43; Y02E 50/343; C05F 17/0063; C05F 17/00; C05F 17/907;
(Continued)

(56) References Cited

U.S. PATENT DOCUMENTS 2,285,834 A * 6/1942 McIntyre ................ C05F 17/00
71/9
2,723,493 A * 11/1955 Stoller .................... A01G 18/20
172/111
(Continued)

FOREIGN PATENT DOCUMENTS

EP 2 486 989 A1 8/2012
JP H08-132008 A 5/1996
(Continued)

OTHER PUBLICATIONS

Schwartz, Mel. (2016). Encyclopedia and Handbook of Materials, Parts, and Finishes (3rd Edition)—Carburizing Flame, (pp. 136). Taylor & Francis. Retrieved from https://app.knovel.com/hotlink/pdf/id:kt011YNE51/encyclopedia-handbook/carburizing-flame (Year: 2016).*

(Continued)

*Primary Examiner* — Jonathan Luke Pilcher
(74) *Attorney, Agent, or Firm* — Oblon, McClelland, Maier & Neustadt, L.L.P.

(57) ABSTRACT

Provided is a novel carbonization treatment method for carbonizing a biomass material containing a large amount of water at an extremely low temperature, and a method for producing carbonized biomass. A water-containing biomass material is carbonized while maintaining the biomass material under treatment conditions including an oxygen-containing atmosphere and a temperature range of 70° C. or greater and less than 100° C., without a drying step for removing or reducing the water forcibly. At this time, (Continued)

preferably the water content (percentage) of the biomass material at the start of carbonization while maintained under the treatment conditions is within a range of 40 to 80% inclusive, and preferably the biomass material is thus maintained for two weeks or longer. Further, as the biomass material, one material or a mixture of two or more materials selected from waste biomass materials and plant (cultivated crop) biomass materials such as food waste, livestock excrement, agricultural waste, marine waste, and forest waste, can be applied.

20 Claims, 6 Drawing Sheets

(51) Int. Cl.
| | |
|---|---|
| C02F 11/10 | (2006.01) |
| B09B 3/00 | (2022.01) |
| C10L 5/42 | (2006.01) |
| C02F 11/13 | (2019.01) |
| C10L 9/08 | (2006.01) |
| C10L 5/44 | (2006.01) |
| C01B 32/90 | (2017.01) |
| C10B 53/02 | (2006.01) |
| C02F 103/20 | (2006.01) |

(52) U.S. Cl.
CPC .............. *C02F 11/13* (2019.01); *C10B 53/02* (2013.01); *C10L 5/42* (2013.01); *C10L 5/44* (2013.01); *C10L 9/08* (2013.01); *C02F 2103/20* (2013.01); *C02F 2209/02* (2013.01); *C05F 17/60* (2020.01); *C10L 2290/02* (2013.01); *C10L 2290/06* (2013.01); *C10L 2290/08* (2013.01)

(58) Field of Classification Search
CPC ...... C05F 17/60; C02F 11/16; C10L 2290/26; C10L 5/40; C10L 5/403; C10L 5/406; C10L 5/42; C10L 5/44; C10L 5/442; C10L 5/445; C10L 5/447; C10L 5/46; C10L 5/48
USPC .............................................................. 71/9
See application file for complete search history.

(56) References Cited

U.S. PATENT DOCUMENTS

| | | | | |
|---|---|---|---|---|
| 3,462,275 | A * | 8/1969 | Bellamy ................ | A23K 10/12 |
| | | | | 210/627 |
| 4,139,640 | A * | 2/1979 | Kipp, Jr. ................ | C05F 3/00 |
| | | | | 426/55 |
| 4,292,328 | A * | 9/1981 | Coulthard ................ | C12N 1/20 |
| | | | | 426/2 |
| 4,909,825 | A * | 3/1990 | Eigner ................ | C05F 3/06 |
| | | | | 71/21 |
| 6,200,475 | B1 * | 3/2001 | Chen ................ | B09B 3/00 |
| | | | | 210/613 |
| 6,576,462 | B2 * | 6/2003 | Thompson ............ | C05F 17/907 |
| | | | | 435/290.1 |
| 8,124,401 | B2 * | 2/2012 | Dutil ................ | C05F 3/00 |
| | | | | 71/10 |
| 9,187,378 | B2 * | 11/2015 | Shaimukhambetova ............ | |
| | | | | C05F 17/993 |
| 2002/0115199 | A1 * | 8/2002 | Thompson ............ | C05F 17/907 |
| | | | | 435/290.1 |
| 2008/0124791 | A1 * | 5/2008 | Bucci ................ | B65F 1/06 |
| | | | | 435/290.4 |
| 2009/0301150 | A1 * | 12/2009 | Dutil ................ | C05F 17/40 |
| | | | | 435/290.2 |
| 2011/0021862 | A1 | 1/2011 | Iwabuchi | |
| 2012/0193212 | A1 | 8/2012 | Taniguro et al. | |
| 2014/0196512 | A1 * | 7/2014 | Shaimukhambetova ............ | |
| | | | | C05F 17/964 |
| | | | | 71/9 |

FOREIGN PATENT DOCUMENTS

| | | |
|---|---|---|
| JP | H11-323346 A | 11/1999 |
| JP | 2001-002486 A | 1/2001 |
| JP | 2001-019580 A | 1/2001 |
| JP | 2007-105605 A | 4/2007 |
| JP | 2009-249240 A | 10/2009 |
| JP | 2011-098330 A | 5/2011 |
| JP | 2011-189268 A | 9/2011 |
| WO | WO 2012/093529 A1 | 7/2012 |
| WO | WO 2012/105240 A1 | 8/2012 |

OTHER PUBLICATIONS

Pace et al., "The Composting Process", Utah State University, Oct. 1995. (Year: 1995).*
Extended European Search Report dated Mar. 18, 2019 in Patent Application No. 17795768.5, 8 pages.
"Hydrothermal Carbonization" ScienceDirect, https://www.sciencedirect.com/topics/engineering/hydrothermal-carbonization XP055564725, 2016, 14 Pages.
Written Opinion dated Mar. 7, 2017 in PCT/JP2017/003383, (English translation).
International Search Report dated Mar. 7, 2017 in PCT/JP2017/003383, (w/ English translation).

* cited by examiner

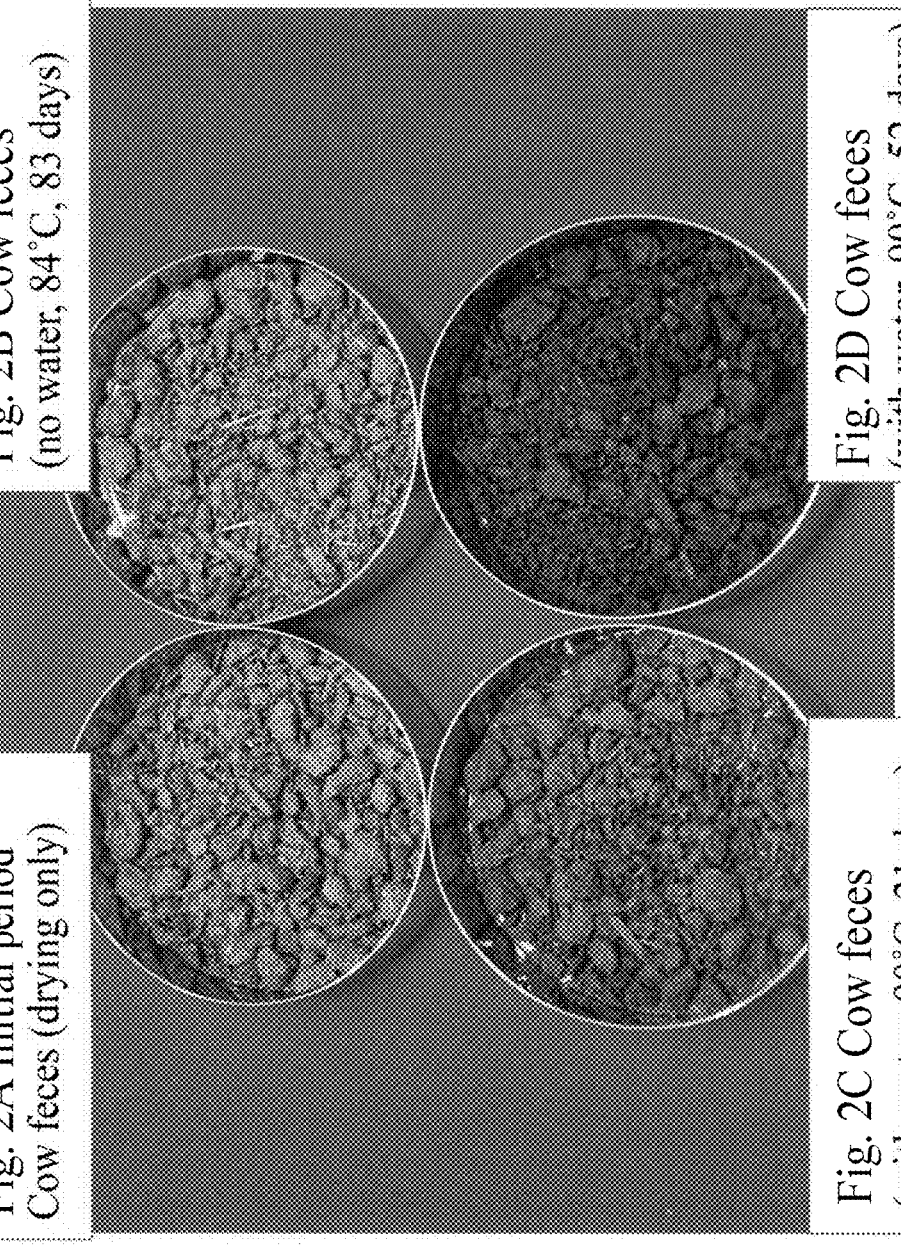

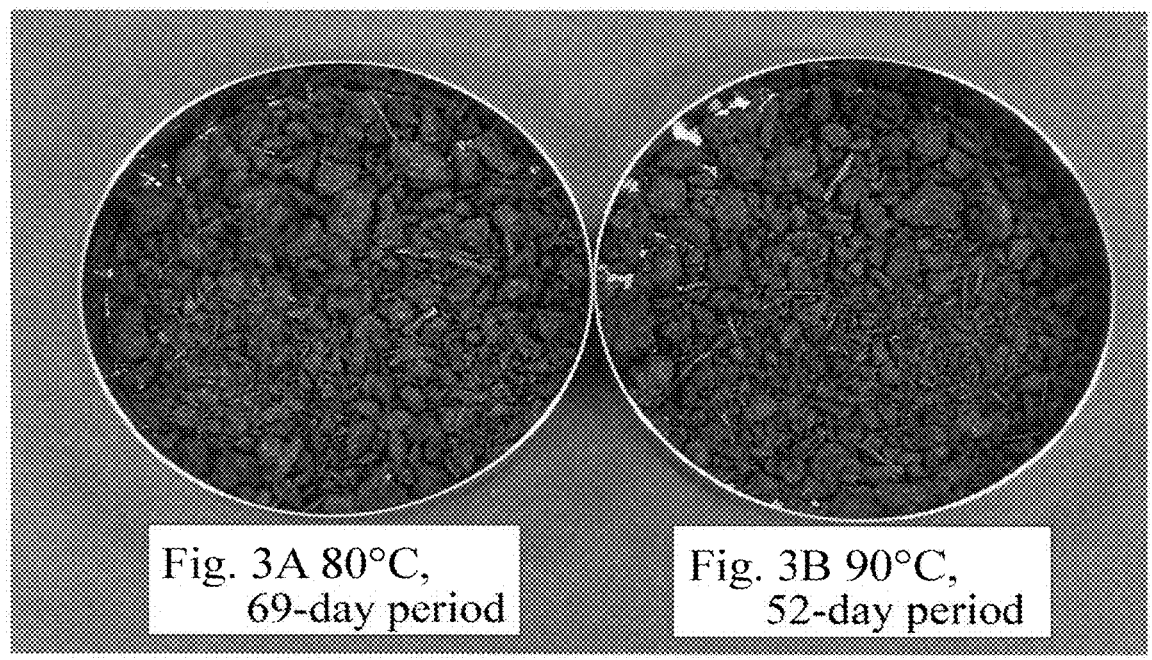
Fig. 3A 80°C, 69-day period
Fig. 3B 90°C, 52-day period
Fig. 4
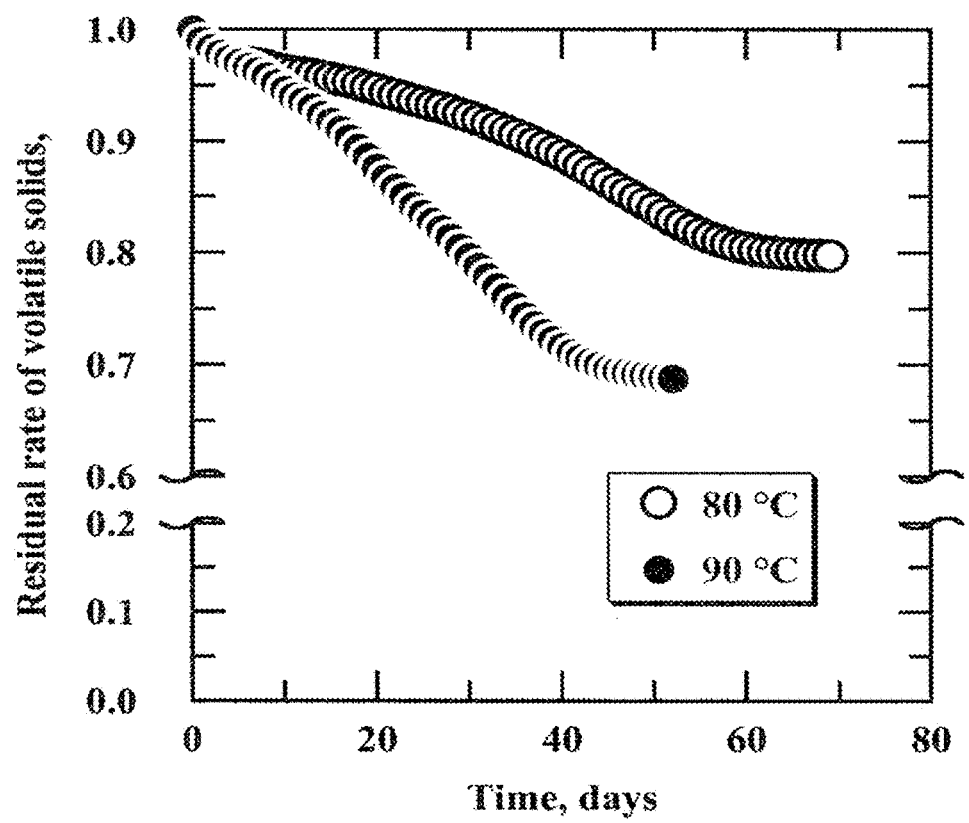

BIOMASS TREATMENT METHOD

CROSS REFERENCE TO RELATED APPLICATIONS

This application is a Continuation-in-Part Application of International Application No. PCT/JP2017/003383, filed Jan. 31, 2017, which claims priority to Japanese Patent Application No. 2016-095471, filed May 11, 2016. The contents of these applications are incorporated herein by reference in their entirety.

FIELD OF THE INVENTION

The present invention relates to a method capable of carbonizing a biomass material of a waste system or a plant (cultivated crop) system at an extremely low temperature, and a method for producing carbonized biomass.

BACKGROUND ART

In recent years, a large amount of organic waste has been subjected to composting treatment or carbonization treatment and reduced to soil for use as a resource. Among such organic waste, livestock feces, raw garbage, and the like (hereinafter collectively referred to as "livestock feces, etc."), which are expected to have the highest resource recovery, are often in a so-called muddy state due to the large amount of water when generated. In particular, when the livestock feces, etc., is subjected to carbonization treatment and utilized as an agricultural or industrial resource, such a large amount of water becomes problematic, requiring a water reduction process. However, in a conventional carbonization treatment device, since the carbonization treatment is performed after waste containing a large amount of water has been dried to a certain degree by heating, the problem arises that the fuel used for heating is largely consumed, releasing a significant amount of combustion gas containing harmful substances, polluting the atmosphere, and the like.

In Patent Document 1, as a carbonization treatment device for reducing the fuel consumption required for carbonization treatment, there is proposed a device that comprises a drying part for decreasing the water content by heating the waste, a carbonization part for baking and carbonizing the dried waste, a dry distillation gas heating supply part for heating and supplying a dry distillation gas generated in the carbonization part to the drying part and a carbonization tube heating chamber, and the like.

In Patent Document 2 as well, as a device for reducing the fuel consumption required for carbonization treatment of a treated object, there is proposed a device that comprises a drying furnace for heating and drying the livestock feces, a hopper for supplying the livestock feces to an interior of a drying part, a carbonization furnace for heating and carbonizing the livestock feces dried in the drying part by an electric heater, communicated with the drying part, a dry distillation gas heating chamber for heating a dry distillation gas generated in the carbonization furnace by the combustion heat of the waste and generating hot gas for drying in the drying furnace, integrally provided with an incineration heating furnace that incinerates the waste, a hot gas supply passage that connects the dry distillation gas heating chamber and drying furnace and introduces hot gas from the dry distillation gas heating chamber to the drying furnace, and a dry distillation gas passage that connects the carbonization furnace and the dry distillation gas heating chamber and introduces the dry distillation gas generated in the carbonization furnace to the dry distillation gas heating chamber.

The carbonization treatment devices proposed in Patent Documents 1 and 2 utilize a dry distillation gas generated during the treatment step to reduce the consumption of fuel required for carbonization treatment. On the other hand, in the background art section of Patent Document 3, as means for decreasing the water content of livestock feces, etc., containing a large amount of water, there is described a method for decreasing the water content by applying thermal energy, air-blowing, or the like to the livestock feces, etc., and a method for reducing the water by mixing agricultural by-products such as sawdust, rice straw, and rice husks with organic waste.

PATENT DOCUMENTS

Patent Document 1: Japanese Laid-Open Patent Application No. H11-323346
Patent Document 2: Japanese Laid-Open Patent Application No. 2007-105605
Patent Document 3: Japanese Laid-Open Patent Application No. 2011-98330

SUMMARY OF THE INVENTION

Problems to be Solved by the Invention

In each of the patent documents described above, means for decreasing the cost of combustion required for water reduction is proposed, and the carbonization treatment of livestock feces, etc., containing a large amount of water is performed by first reducing the water and then heating.

An object of the present invention is to provide a novel carbonization treatment method for carbonizing a biomass material of a waste system or a plant (cultivated crop) system containing a large amount of water at an extremely low temperature, and a method for producing carbonized biomass.

Means for Solving the Problems

The present inventors, when working with livestock feces containing a large amount of water in the course of studying carbonization treatment methods of a biomass material of a waste system or a plant (cultivated crop) system, unintentionally discovered that a biomass material maintained at a temperature that does not reach 100° C. was naturally carbonized. The present invention has been completed on the basis of these findings.

(1) An ultra-low temperature carbonization treatment method of a biomass material according to the present invention comprises the step of carbonizing a water-containing biomass material while maintaining the biomass material under treatment conditions including an oxygen-containing atmosphere and a temperature range of 70° C. or greater and less than 100° C., without a drying step for removing or reducing the water forcibly.

According to the present invention, the water-containing biomass material can be carbonized by simply maintaining the biomass material under the above-described treatment conditions, without a drying step for removing or reducing the water forcibly as in the related art. The carbonization that occurs while the biomass material is maintained under such treatment conditions was found to advance by an oxidation reaction that occurs between the oxygen and the biomass material, and promote the carbonization reaction by the water contained in the biomass material. This carbonization treatment method does not need the large equipment required for drying and does not consume large amounts of electrical energy, making it possible to carbonize the biomass material at a low cost.

In the ultra-low temperature carbonization treatment method of a biomass material according to the present invention, preferably the biomass material has a water content (percentage) within a range of 40 to 80%, inclusive, at the start of carbonization while the biomass is maintained under the treatment conditions. According to the present invention, in the carbonization of the biomass material maintained at an ultra-low temperature, the water content of the biomass material at the start of carbonization treatment is preferably within the above-described range.

In the ultra-low temperature carbonization treatment method of a biomass material according to the present invention, preferably the biomass material is thus maintained for at least two weeks. According to the present invention, the biomass material is thus maintained for at least two weeks, making it possible to advance the carbonization of the biomass material in a stable manner.

In the ultra-low temperature carbonization treatment method of a biomass material according to the present invention, the biomass material is one material or a mixture of two or more materials selected from waste biomass materials and plant (cultivated crop) biomass materials such as food waste, livestock excrement, agricultural waste, marine waste, and forest waste. According to the present invention, the ultra-low temperature carbonization treatment method according to the present invention can be applied to these various types of biomass materials.

In the ultra-low temperature carbonization treatment method of a biomass material according to the present invention, preferably the biomass material is stored in a container comprising an air open port and a temperature controller for maintaining the biomass material under the treatment conditions. According to the present invention, the biomass material is stored in the container comprising an air open port and a temperature controller, making it possible to achieve an oxygen-containing atmosphere and temperature conditions, and thus start and advance the carbonization of the biomass material in a stable manner.

(2) A method for producing carbonized biomass according to the present invention is a carbonization treatment method of a biomass material, the method comprising the steps of maintaining a water-containing biomass material having a water content (percentage) within a range of 40 to 80%, inclusive, at the start of carbonization, under treatment conditions including an oxygen-containing atmosphere and a temperature range of 70° C. or greater and less than 100° C., without a drying step for removing or reducing the water forcibly, and producing an oxidation reaction between oxygen in the atmosphere and the biomass material to carbonize the biomass material without adding bacteria.

(3) A method for producing carbonized biomass according to the present invention is a method for producing carbonized biomass using the ultra-low temperature carbonization treatment method of a biomass material according to the present invention described above, the method comprising the steps of preparing a water-containing biomass material, and treating the biomass material thus prepared under treatment conditions including an oxygen-containing atmosphere and a temperature range of 70° C. or greater and less than 100° C., without a drying step for removing or reducing the water forcibly.

Effect of the Invention

According to the present invention, it is possible to provide a novel carbonization treatment method for carbonizing a biomass material of a waste system or a plant (cultivated crop) system containing a large amount of water at an extremely low temperature, and a method for producing carbonized biomass.

BRIEF DESCRIPTION OF THE DRAWINGS

FIG. 2A is an image of cow feces prior to treatment, and FIGS. 2B to 2D are images of the cow feces after treatment in Experiments 2 to 4.

FIG. 3A is an image of the cow feces after treatment in Experiment 1, and FIG. 3B is an image of the cow feces after treatment in Experiment 3.

FIG. 4 is a graph showing the weight loss results of a biomass material during carbonization treatment in Experiments 1 and 3.

EMBODIMENTS OF THE INVENTION

Figure 1:
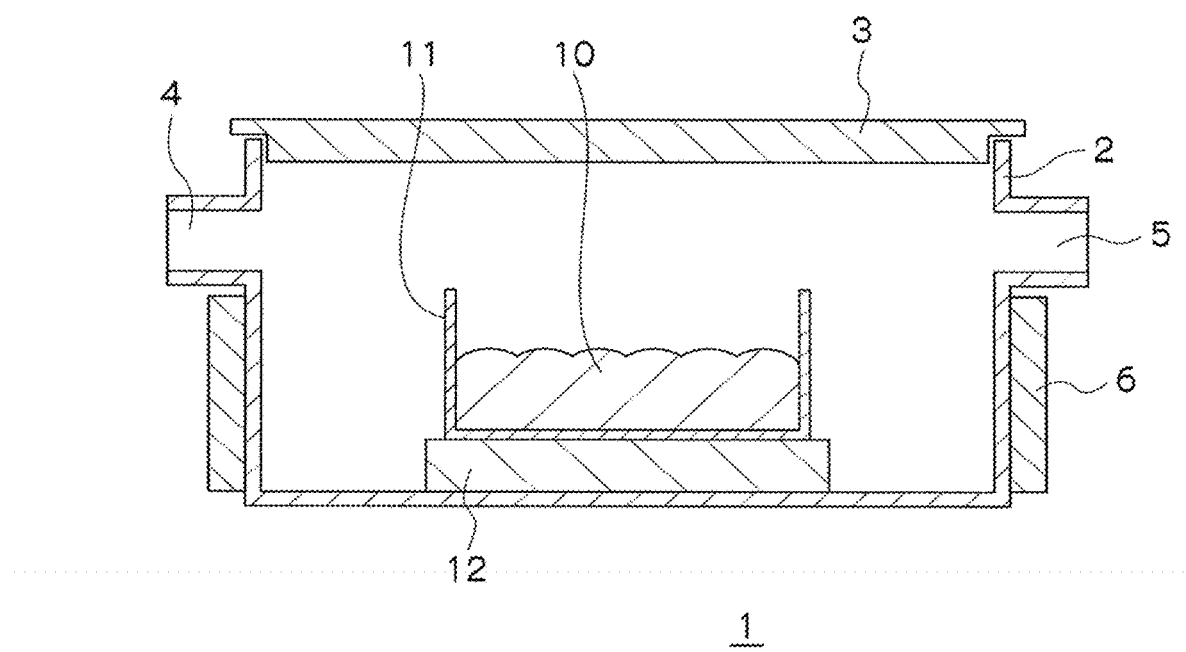
FIG. 1 is an explanatory view illustrating an example of an ultra-low temperature carbonization treatment method of a biomass material according to the present invention.

An ultra-low temperature carbonization treatment method of a biomass material and a method for producing carbonized biomass according to the present invention are described below in detail with reference to the drawings. Note that the following embodiment is a preferred example of the present invention, but the interpretation of the present invention is not limited to that embodiment.

[Ultra-Low Temperature Carbonization Treatment Method of Biomass Material]

The ultra-low temperature carbonization treatment method of a biomass material according to the present invention is a novel method for carbonizing a biomass material containing a large amount of water at an extremely low temperature. The method comprises a step of carbonizing a water-containing biomass material while maintaining the biomass material under treatment conditions including an oxygen-containing atmosphere and a temperature range of 70° C. or greater and less than 100° C., without a drying step for removing or reducing the water forcibly. More specifically, the method is a carbonization treatment method of a biomass material comprising the steps of maintaining a water-containing biomass material having a water content (percentage) within a range of 40 to 80%, inclusive, at the start of carbonization, under treatment conditions including an oxygen-containing atmosphere and a temperature range of 70° C. or greater and less than 100° C., without a drying step for removing or reducing the water forcibly, and producing an oxidation reaction between oxygen in the atmosphere and the biomass material to carbonize the biomass material without adding bacteria.

This method is based on an unintentional discovery when working with livestock feces containing a large amount of water in the course of studying carbonization treatment methods of a biomass material. According to this discovery, a biomass material maintained at a temperature that does not reach 100° C. (a low temperature considered unlikely as a carbonization treatment temperature; referred to as "ultra-low temperature" in the present application) was naturally carbonized. According to the present invention, a water-containing biomass material can be carbonized by simply maintaining the biomass material under the above-described treatment conditions, and thus there is no need to include a drying step for removing or reducing the water forcibly as in the related art. The carbonization that occurs while the biomass material is maintained under such treatment conditions was found to advance by an oxidation reaction that occurs between the oxygen and the biomass material, and promote the carbonization reaction by the water contained in the biomass material. As a result, the carbonization treatment method of the present invention (referred to as "ultra-low temperature carbonization treatment method") does not need the large equipment required for drying and does not consume large amounts of electrical energy, making it possible to carbonize the biomass material at a low cost.

A description of the components of the ultra-low temperature carbonization treatment method of a biomass material is given below. Note that, unless otherwise specified, "%" of water content (percentage) refers to "weight % (mass %)."

(Biomass Material)

The biomass material may be a biomass material that contains a large amount of water, such as a waste biomass material or a plant (cultivated crop) biomass material, for example. Examples of the biomass material include one material or a mixture of two or more materials selected from waste biomass materials and plant (cultivated crop) biomass materials such as food waste, livestock excrement, agricultural waste, marine waste, and forest waste. Specific examples of the waste biomass materials include food waste (food residue) such as raw garbage, livestock excrement (feces and urine) such as cow, pig, and horse feces, agricultural waste such as surplus products, sorting discards, and processing by-products (rice bran and the like), marine waste such as excess marine products and processing garbage, forest waste such as wood shavings, wood chips, and machining garbage, and the like. Further, examples of the plant (cultivated crop) biomass materials include materials utilized in the conversion of plants such as sugar cane and rape seed to fuel alcohol and the like. These waste biomass materials and plant (cultivated crop) biomass materials may be a single material or a mixture of a plurality of types.

The waste biomass material may be a composted material or the like as long as the material is of biological origin. Note that the term "waste" naturally includes matter that is actually discarded, but also includes matter that can be used in other applications, even if initially discarded. For example, matter obtained by composting waste or the like, even when considered waste prior to composting, can be useful and not considered waste after composting. In the present invention, the term "waste" expresses such cases as well.

Note that, in general, "biomass" is a term expressing the amount (mass) of biological resources (bio), and refers to "renewable organic resources of biological origin (excluding fossil fuels)." Further, waste biomass refers to organic resources such as industrial waste (black liquor and wood chips) discharged in a process such as papermaking, waste and by-products (rice husks, cow feces, and the like) discharged in agricultural, forestry, and livestock industrial processes, and general waste (garbage, waste cooking oil, and the like), while plant (cultivated crop) biomass refers to organic resources utilized in the conversion of plants such as sugar cane and rape seed to fuel alcohol and the like. "Biomass materials" used in the present invention are renewable organic resources of biological origin (excluding fossil fuels), and refer to both waste biomass and plant (cultivated crop) biomass.

Biomass materials contain large amounts of water. The water content (percentage) of a biomass material at the start of carbonization while maintained under carbonization treatment conditions (when the biomass material is supplied for carbonization treatment; hereinafter the same) is preferably within a range of 40 to 80%, inclusive. With the biomass material maintained under carbonization treatment conditions within this range of water content, it is possible to start and subsequently advance the carbonization of the biomass material. The water content of the biomass material can be evaluated by weighing the extracted biomass material before and after drying.

Note that the water content need only be within the above-described range at the start of supply for carbonization treatment, and a dried body or substantially dried body in which the biomass material has a water content less than 40% can be used as a biomass material supplied for carbonization treatment by adding water and increasing the water content to 40% or greater. On the other hand, a muddy body in which the biomass material has a water content exceeding 80% can be used as a biomass material supplied for carbonization treatment by leaving the material alone (naturally drying the material) and the like, until the water reduces to 80% or less. Note that examples of natural drying include sun drying, ventilation, dispersion, and the like, and drying may be performed by air-blowing as needed.

Other waste may be mixed into the biomass material within a range that does not inhibit the carbonization in the present invention. Examples of other biomass materials include plastic materials (partition decorations, bottle caps, straws, rubber bands, packing material, and the like), paper products, wood products (disposable chopsticks, toothpicks, and the like), and the like, which are easily discarded with raw garbage from households.

(Treatment Conditions)

In the carbonization treatment of the present invention, the water-containing biomass material is maintained under treatment conditions including an oxygen-containing atmosphere and a temperature range of 70° C. or greater and less than 100° C., without a drying step for heating at about 500° C., for example, to forcibly remove or reduce the water contained in the biomass material as in the related art. The carbonization at this time advances by the oxidation reaction that occurs between the oxygen and biomass material within the temperature range of 70° C. or greater and less than 100° C., promoting and advancing the carbonization reaction by the water contained in the biomass material.

The carbonization treatment is started and advanced in an oxygen-containing atmosphere. As illustrated in experiment examples (FIG. 5 and FIG. 6) described later as well, since the carbon dioxide production rate and the oxygen uptake rate are proportionally related, presumably, once the oxidation reaction occurs between the biomass material and the oxygen to produce carbon dioxide, the oxygen uptake rate increases to the extent that the carbon dioxide is produced, advancing carbonization. The oxygen-containing atmosphere, while not particularly limited as long as one that contains oxygen, may normally be an open air atmosphere. The oxygen needs to be continually present while carbonization is in progress. The oxygen content need only be the level contained in the atmosphere (approximately 21%). The oxygen may simply be contained at a level that allows an oxidation reaction to occur and continue between the oxygen and the biomass material (several percentage of oxygen). On the other hand, in an atmosphere that does not contain oxygen, an oxidation reaction of the biomass material does not occur, and carbonization cannot advance.

The temperature of the carbonization treatment need only be within the temperature range of 70° C. or greater and less than 100° C. described above, even if fluctuation exists within that range. While the results obtained at 80° C. and 90° C. are shown in the experiment examples described later, the advancement of carbonization within the temperature range of 70° C. or greater and less than 100° C. has been confirmed. This does not necessarily mean that carbonization will not advance even when the temperature is less than 70° C., but the water may not readily reduce and carbonization may not readily advance, requiring significant time for carbonization and making such a temperature not very economical. On the other hand, water immediately evaporates at 100° C. or greater, causing the biomass material to dry and the carbonization reaction to no longer advance and to stop. Thus, while oxygen and a certain amount of water (a water content of 40 to 80%, inclusive) at the above-described temperature (70° C. or greater and less than 100° C.) are required at the start of carbonization, the carbonization reaction will not adequately advance when the water is slowly reduced and the above-described water content at the start of carbonization remains as is for a long period of time. Preferably, as described later, the carbonization reaction advances while the water at the start of carbonization (water content of 40 to 80%, inclusive) is gradually reduced by evaporation or the like over a maintenance period of two weeks or longer, ultimately forming a dried carbonized biomass (with a water content of 5% or less, for example). On the other hand, when the water immediately evaporates or the like and dries before a maintenance period of two weeks or longer elapses, the oxidation reaction slows and carbonization no longer occurs. Thus, preferably, the oxidation reaction continues and carbonization advances while the water gradually (not rapidly) reduces within the above-described temperature range over a maintenance period of two weeks or longer.

The above-described temperature is maintained by heating a reactor vessel that stores the biomass material as illustrated in FIG. 1, for example. The heating may be performed by an electric heater, steam supplied from a boiler or the like, or the use of heat from other heat sources. Note that the temperature may be maintained by heat produced by a microbial reaction of the biomass material. The microbial reaction that occurs as a result of the biomass material coming into contact with oxygen generates a temperature of approximately 70 to 80° C. and thus, once heat is generated by the microbial reaction, it is also possible to maintain the temperature by the heat generated from the microbial reaction and continue the carbonization treatment without heating or by only slightly heating with an electric heater or the like.

The maintenance period of the carbonization treatment is preferably at least two weeks. While the maintenance period differs depending on the treatment temperature as well, it is possible to advance the oxidation reaction and the carbonization in a stable manner by maintaining the material for at least two weeks within the range of 70° C. or greater and less than 100° C. Note that this maintenance period of two weeks is not a period that allows formation of carbonized biomass upon complete carbonization of the biomass material (100% carbonized biomass), but is a period that allows stabilization of the carbonization treatment and partial but not complete carbonization. Within the range of 70° C. or greater and less than 100° C., as the temperature approaches 70° C., the degree of water reduction decreases and carbonization slowly advances, lengthening the maintenance period. On the other hand, as the temperature approaches 100° C., carbonization is promoted, shortening the maintenance period.

Note that, while the upper limit of the maintenance period differs according to the water content, treatment temperature, maintenance environment (oxygen content, degree of water reduction, and the like) and is thus not particularly limited. However, the maintenance period lengthens when the temperature is low and shortens when the temperature is high, as illustrated in the experiment examples described later, for example. The upper limit is within a range of three weeks (21 days) to 12 weeks (84 days) in the experiment examples, for example, but may be two weeks when the maintenance period is for partial carbonization in which the degree of carbonization is low, and may exceed 12 weeks when the maintenance period is for increased carbonization. When carbonization may be performed slowly over a long period of time, the maintenance period may be, for example, several months or longer (for example, six months, 12 months, or the like).

Carbonization at ultra-low temperatures cannot advance with a biomass material that does not contain water, and cannot adequately advance even when the water in the biomass material is abruptly reduced or eliminated in a short period of time. Further, when the temperature exceeds 100° C., the water in the biomass material readily evaporates and is quickly eliminated. Further, under atmospheric pressure, carbonization under a temperature environment of 160° C. or less, in which spontaneous combustion does not occur, cannot advance. Thus, in the carbonization treatment of the present invention, water is present until the carbonization reaction is completed within the range of the above-described treatment conditions, in other words, the carbonization reaction advances in the presence of water.

Carbonization under the above-described treatment conditions continues while water is contained in the biomass material. The water content (percentage) required for continuation need only be at least 5%. With a biomass material having a water content of at least 5%, carbonization advances within the above-described treatment conditions.

While the water content in the biomass material becomes approximately 5% or less in the final stage of carbonization, with the carbonization treatment in the present invention, it is possible to not form carbonized biomass in which the organic components of the biomass material are 100% carbonized. When the degree of carbonization is low, the water content in the biomass material may be higher, such as 10% or 20%. On the other hand, when the degree of carbonization is high, the water content in the biomass material is low, such as 10%, 5%, or less. To form carbonized biomass that is 100% carbonized, preferably the maintenance period is even longer and, although dependent on the treatment temperature and water content as well, preferably the maintenance period is seven weeks or longer, for example. Note that, as described in the maintenance period section, the upper limit at this time is affected by water content, treatment temperature, and maintenance environment (oxygen content, degree of water reduction, and the like), and may be, for example, several months or longer (for example, six months, 12 months, or the like), depending on the degree of carbonization.

On the other hand, even with a treated object that is not 100% carbonized biomass, there is the advantage of achieving a significant reduction in the weight or the volume of the biomass material. Such a treated object is dried to some extent and reduced in weight or volume by the decrease in water content, making transport easier. As a result, it is possible to move the object to another location or into a treatment vessel and perform a subsequent carbonization treatment or the like once again. While the mode by which the biomass material is to be treated must be considered within an overall treatment scheme, the above results in the advantage that the carbonization treatment method of the present invention can be incorporated as an extremely flexible and easy method within such an overall treatment scheme.

As described above, carbonization of a water-containing biomass material can be carried out while maintaining the biomass material for a long period of time at an ultra-low temperature less than 100° C. in an oxygen-containing atmosphere. As a result, without the need for the large equipment required for drying and without consumption of large amounts of electrical energy, carbonization of the biomass material can be carried out at low cost.

(Treatment Vessel, Other)

Examples of the treatment vessel, as illustrated in FIG. 1, preferably include a reactor vessel 1 comprising a heating device 6 for maintaining a biomass material 10 within the above-described temperature range, and an air open port (an intake port 4 and an exhaust port 5). With such a reactor vessel 1, it is possible to perform carbonization of the biomass material 10 in a stable manner.

The reactor vessel 1, as illustrated in FIG. 1, comprises a container main body 2 and a lid 3, and further comprises the intake port 4 and the exhaust port 5 for air or oxygen from the outside. The structural form of this reactor vessel 1 is not particularly limited to that illustrated in FIG. 1 as long as the vessel can at least maintain a temperature within the range of 70° C. or greater and less than 100° C. and air or oxygen can be introduced and discharged. The container main body 2 and the lid 3 may or may not be sealable. A size and a shape of the intake port 4 and the exhaust port 5 are not particularly limited as long as air or oxygen can be introduced into and discharged from the reactor vessel 1.

The biomass material 10 is stored in the reactor vessel 1. The biomass material 10 may be stored as is in the reactor vessel 1, or may be placed in the reactor vessel 1 after being inserted into a storage container 11 such as illustrated in FIG. 1. A material, a size, a shape, and the like of the reactor vessel 1, and a material, a size, a shape, and the like of the storage container 11 are not particularly limited, and can be designed as desired in accordance with the treatment amount and usage mode of the biomass material 10. Note that reference numeral 12 denotes a stand for the storage container 11.

The reactor vessel 1 is provided with the heating device 6 which allows heating to a temperature of 70° C. or greater and less than 100° C. described above. The heating device 6 may be a heating device that uses an electric heater, a heating device with introduction piping for steam supplied from a boiler or the like, or a heating device that utilizes heat from another heat source.

The carbonization treatment of the present invention can be used in various applications, and controlled as desired. For example, the carbonization treatment can be advanced once again by adding water to the biomass material and subsequently setting the biomass material to a predetermined temperature (70° C. or greater and less than 100° C.) once again. On the other hand, when the carbonization treatment is to be stopped, the water contained in the biomass material may be forcibly reduced. With the carbonization treatment of the present invention, carbonization can be advanced and stopped by controlling treatment conditions, resulting in a significantly large degree of freedom in the treatment method. As means for controlling treatment conditions, carbonization can be stopped or slowed by decreasing the temperature to less than 70° C., stopping the supply of oxygen, increasing the temperature to 100° C. or greater to evaporate and remove the water, or the like. On the other hand, carbonization can be restarted by returning the temperature to 70° C. or greater and less than 100° C., restarting the supply of oxygen, adding water, or the like. The carbonization treatment of the present invention, by thus allowing free control of the stopping and restarting of carbonization, makes it possible to freely change the carbonization period, change the carbonization location, and reduce the weight or volume of carbonization in the preliminary stage.

[Method for Producing Carbonized Biomass]

The method for producing carbonized biomass according to the present invention is a method for producing carbonized biomass using the ultra-low temperature carbonization treatment method of a biomass material according to the present invention described above. Then, the method comprises the steps of preparing a water-containing biomass material (preparing step), and treating the biomass material thus prepared under treatment conditions including an oxygen-containing atmosphere and a temperature range of 70° C. or greater and less than 100° C., without a drying step for removing or reducing the water forcibly (treatment step).

These steps are described in the description section of the ultra-low temperature carbonization treatment method of a biomass material according to the present invention described above, and thus repetitive descriptions thereof will be omitted.

The treated object treated in the treatment step is obtained by partial carbonization or complete carbonization the biomass material. "Partial carbonization" refers to not carbonizing the biomass material in its entirety to charcoal. On the other hand, "Complete carbonization" refers to carbonizing the biomass material in its entirety to charcoal. In the method for producing carbonized biomass according to the present invention, while both partial carbonization and complete carbonization are included, partial carbonization may be performed followed by complete carbonization using another method. Examples of the other method include a method in which carbonization is performed using the heat of a renewable energy such as biogas, or the like.

Note that partial carbonization, while not resulting in 100% carbonized biomass, can achieve a significant reduction in the weight or the volume of the biomass material, and thus is advantageous from that perspective as well. A treated object with a reduced weight or volume of biomass material is easily transported, and thus can be moved to another location or into a treatment vessel and subjected to a subsequent carbonization treatment or the like once again.

Examples

The following further describes the ultra-low temperature carbonization treatment method of a biomass material according to the present invention in further detail using experiment examples.

[Experiment 1]

Cow feces taken from a cowshed (water content of 60% w.b., 200 g) was used as an experiment sample. The sample was inserted into the storage container 11 made of stainless steel illustrated in FIG. 1, the storage container 11 was placed into the reactor vessel 1, and the reactor vessel 1 was covered with the lid 3. This reactor vessel 1 comprises the intake port 4 and the exhaust port 5 for air. The reactor vessel 1 is provided with the heating device 6, making it possible to keep the interior of the reactor vessel 1 at a constant temperature. The temperature inside the reactor vessel was set to 80° C. and, with the air intake and exhaust ports open, the sample was maintained for 69 days (approximately 10 weeks).

[Experiment 2]

The temperature inside the reactor vessel was set to 90° C., and the sample was maintained for 21 days (three weeks). All other conditions were the same as those in Experiment 1.

[Experiment 3]

The temperature inside the reactor vessel was set to 90° C., and the sample was maintained for 52 days (approximately 7.5 weeks). All other conditions were the same as those in Experiment 1.

[Experiment 4]

Without the lid 3, the temperature inside the reactor vessel was set to 84° C., and the sample was maintained for 83 days (approximately 12 weeks). All other conditions were the same as those in Experiment 1.

[Experiment 5]

The temperature inside the reactor vessel was set to 70° C., and the sample was maintained for 150 days (five months). All other conditions were the same as those in Experiment 1.

[Experiment 6]

The temperature inside the reactor vessel was set to 90° C. and, to ensure that the atmosphere inside the vessel did not become an oxygen-containing atmosphere, nitrogen was introduced from the intake port 4 of the reactor vessel 1 and discharged from the exhaust port 5, creating a nitrogen atmosphere. All other conditions were the same as those in Experiment 1.

[Experiment 7]

The temperature inside the reactor vessel was set to 90° C., and cow feces having a water content of 80% w.b. was used. All other conditions were the same as those in Experiment 1.

[Experiment 8]

The temperature inside the reactor vessel was set to 90° C., and cow feces having a water content of 42% w.b. was used. All other conditions were the same as those in Experiment 1.

[Experiment 9]

The temperature inside the reactor vessel was set to 90° C., and cow feces having a water content of 33% w.b. was used. All other conditions were the same as those in Experiment 1.

[Measurement]

(Carbon Dioxide Production Rate)

The carbon dioxide production rate was calculated by measuring the $CO_2$ concentration of the gas introduced into the reactor vessel and the gas discharged from the reactor vessel by gas chromatography, and then multiplying the difference by a flow rate F of air [F ($CO_2$in–$CO_2$out)].

(Oxygen Uptake Rate)

The oxygen uptake rate was calculated by measuring the $O_2$ concentration of the gas introduced into the reactor vessel and the gas discharged from the reactor vessel using a galvanic cell type oxygen sensor, and then multiplying the difference by the flow rate F of air [F ($O_2$in–$O_2$out)].

(Weight Loss Curve)

The weight loss curve was calculated from the generated amount of carbon dioxide. That is, a total solid mass reduction TM was calculated from the difference between the solid mass at the start of carbonization treatment and the solid mass at the end of carbonization treatment. Further, similarly, the total carbon dioxide generating amount $TCO_2$ was found, and then the solid mass reduction per unit of carbon dioxide generating amount $TM/TCO_2$ was calculated. Then, the solid mass reduction per carbon dioxide generating amount ($\Delta CO_2$) was calculated by $\Delta CO_2 \times (TM/TCO_2)$. Note that the weight loss curve was calculated from the measured mass after the sample was dried to remove water before mass measurement.

[Results]

FIG. 2A is an image of a sample (cow feces) before treatment. FIG. 2B is an image of a sample after treatment in Experiment 4 (84° C., 83 days, without lid). FIG. 2C is an image of a sample after treatment in Experiment 2 (90° C., 21 days, with lid). FIG. 2D is an image of a sample after treatment in Experiment 3 (90° C., 52 days, with lid). Based on the results, the samples after treatment in Experiments 2 and 3 turned black as a result of advanced carbonization. On the other hand, in the sample after treatment in Experiment 4, the water immediately evaporated without the lid, causing the sample to dry, and thus carbonization did not advance and the sample remained substantially the same as that before treatment. Further, FIG. 3A shows a sample after treatment in Experiment 1 (80° C., 69 days, with lid) and the sample exhibited a blacker color as a result of more advanced carbonization than the sample after treatment in Experiment 3 (90° C., 52 days, with lid) shown in FIG. 3B. Based on these results, it was found that the presence of water is necessary for the advancement of carbonization at a temperature less than 100° C.

FIG. 4 shows the weight loss results of the biomass material during carbonization treatment in Experiment 1 (80° C., 69 days) and Experiment 3 (90° C., 52 days). In both cases, the mass gradually reduced with a lapse of days, reducing by approximately 21% after a lapse of 69 days in the case of 80° C., and by approximately 32% after a lapse of 52 days in the case of 90° C. The weight loss is considered to be due to the carbonization of the organic matter contained in the biomass material.

Figure 5:
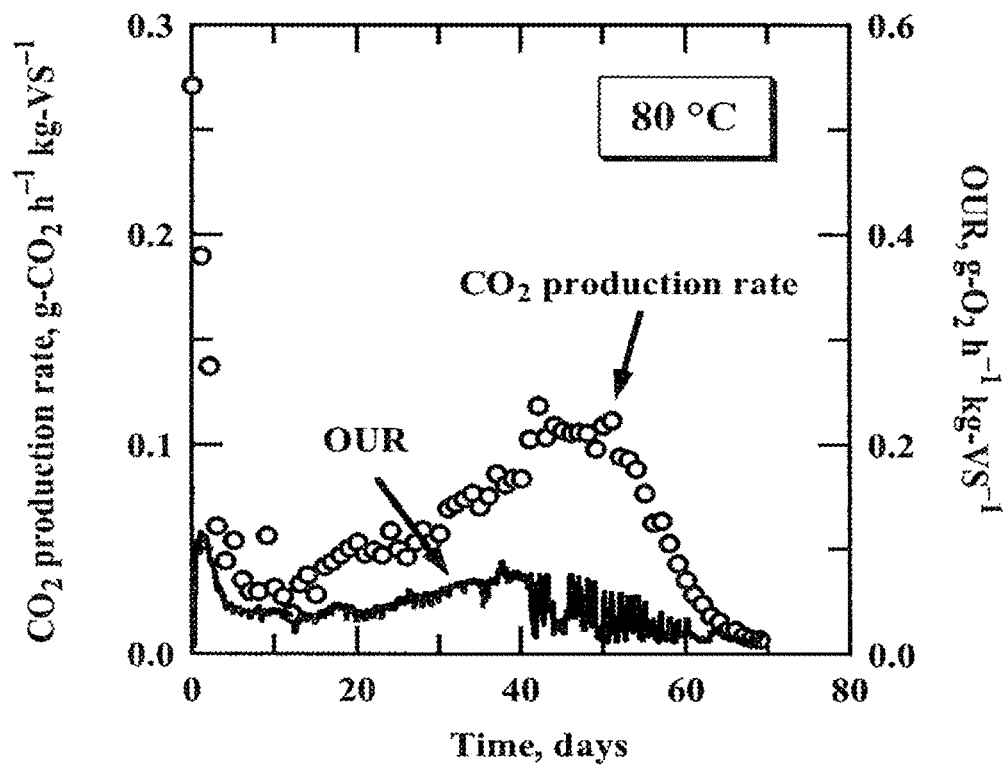
FIG. 5 is a graph showing the carbon dioxide production rate and oxygen uptake rate per unit mass of a biomass material during carbonization treatment in Experiment 1.
Figure 6:
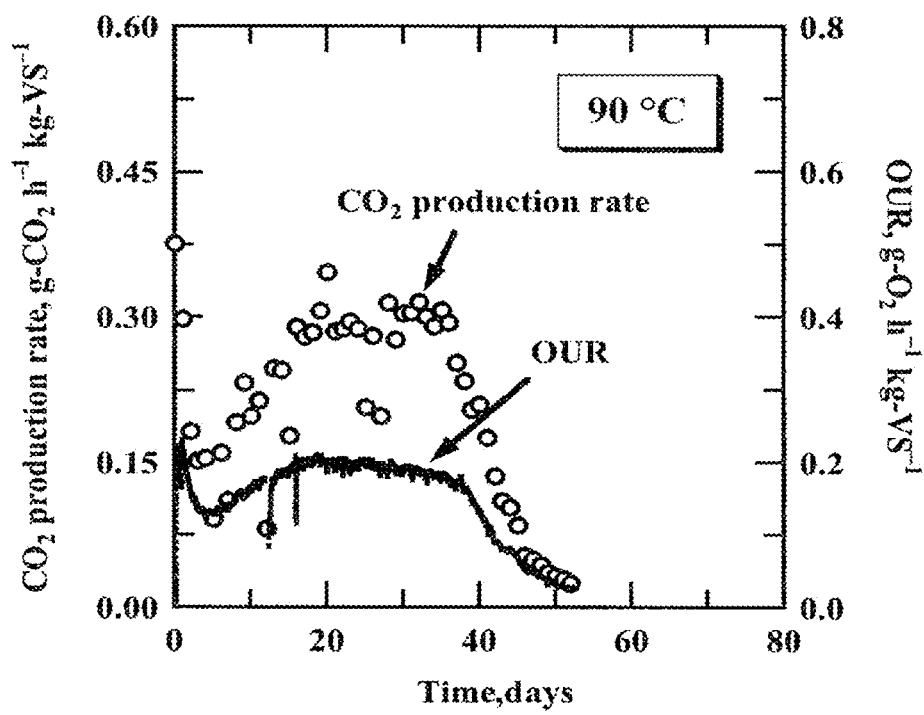
FIG. 6 is a graph showing the carbon dioxide production rate and oxygen uptake rate per unit mass of a biomass material during carbonization treatment in Experiment 3.

FIG. 5 is a graph showing the carbon dioxide production rate and oxygen uptake rate (OUR) per unit mass of biomass material during carbonization treatment in Experiment 1 (80° C., 69 days). FIG. 6 is a graph showing the carbon dioxide production rate and oxygen uptake rate (OUR) per unit mass of biomass material during carbonization treatment in Experiment 3 (90° C., 52 days). From these results it is understood that the oxygen had a lower concentration than in the composition of air, and carbon dioxide had a higher concentration than in the composition of air. Further, because the production rate of carbon dioxide produced by the carbonization reaction of the biomass material is proportionally correlated with the oxygen uptake rate, it is understood that, once an oxidation reaction occurred, carbon dioxide was produced, and the oxygen uptake rate increased to the extent that the carbon dioxide was produced. Such a correlation means that the carbonization phenomenon advances in the presence of oxygen, and this indicates that the carbonization treatment requires the presence of air (strictly oxygen). Therefore, in this carbonization treatment, presumably an oxidation reaction occurred between the oxygen in the air and the biomass material, thereby producing carbon dioxide.

In Experiment 5 to Experiment 9, experiments were conducted by changing various conditions, and the presence or absence of carbonization was visually confirmed. Experiment 5 is an experiment in which the sample was left for five months at 70° C. The sample after treatment exhibited a black color, and carbonization was confirmed. Experiment 6 is an experiment with oxygen removed. The sample after treatment exhibited negligible change and was similar to the sample before treatment, and no advancement in carbonization was confirmed. Experiment 7 is an experiment in which the water content was set to 80%. The sample after treatment exhibited a black color, and carbonization was confirmed. Experiment 8 is an experiment in which the water content was set to 42%. The sample after treatment exhibited a black color, and carbonization was confirmed. Experiment 9 is an experiment in which the water content was set to 33%. The sample after treatment exhibited negligible change and was similar to the sample before treatment, and inadequate advancement in carbonization was confirmed.

Figure 7A:
FIGS. 7A to 7C are images of samples after treatment in Experiments 6, 7, and 9.
Figure 7B:
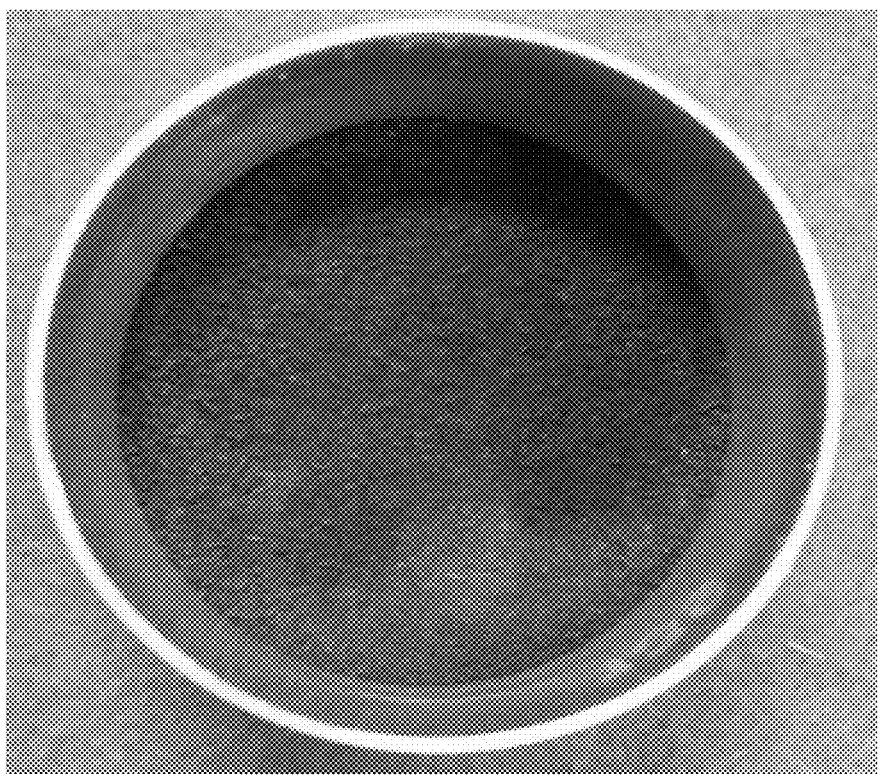
Figure 7C:

FIGS. 7A to 7C are images of samples after treatment in Experiments 6, 7, and 9 among Experiments 5 to 9 described above. While the sample in the image of Experiment 7 shown in FIG. 7B exhibited a black color and carbonization was confirmed, the samples in the image of Experiment 6 shown in FIG. 7A and the image of Experiment 9 shown in FIG. 7C were not black in color and carbonization was not confirmed.

As described above, the ultra-low temperature carbonization treatment method of a biomass material according to the present invention can eliminate some of the drawbacks of a biomass material. That is, (1) the biggest challenge of many biomass materials represented by cow feces and the like has been the removal of water contained in large amounts therein. However, according to the present invention, the presence of water is necessary for carbonization, and thus the cost and effort for water removal are not required. (2) In a typical charcoal production method, when carbonization is conducted by heating the material at a high temperature of 500° C. or greater, a thermal decomposition reaction advances, causing the generated gas to contain large amounts of tar. Therefore, costs occur due to the need for a device for removing the tar, and the like. However, according to the present invention, a thermal decomposition reaction substantially does not occur, making it possible to suppress the generation of tar. (3) Further, according to the present invention, since carbonization is possible at an ultra-low temperature less than 100° C., the energy applied from the outside can be significantly reduced compared to the production of charcoal in the related art. Furthermore, it is also possible to achieve such a low temperature using a renewable energy, such as biogas.

DESCRIPTIONS OF REFERENCE NUMERALS

1 Reactor vessel
2 Container main body
3 Lid
4 Intake port
5 Exhaust port
6 Heating device
10 Biomass material
11 Storage container
12 Stand

What is claimed is:

1. A method of treating a biomass material, comprising: maintaining a water-containing biomass material in a reactor vessel, the water-containing biomass material having a water content within a range of 40 to 80%, inclusive, at the start of the maintaining, under treatment conditions including an oxygen-containing atmosphere and a temperature range of 70° C. or greater and less than 100° C., such that the water is removed from the biomass material during the maintaining only by natural drying or drying which occurs as a result of introduction of the atmosphere and/or the temperature being maintained in the temperature range, that an oxidation reaction occurs between oxygen in the atmosphere and the biomass material in the presence of the water to generate carbon dioxide, and that the water-containing biomass material has a water content within a range of 5 to 20%, inclusive, at the end of the maintaining,
wherein the reactor vessel has a container main body and a lid covering the container main body, and has an intake port and an exhaust port for introducing and discharging the atmosphere, and
the maintaining of the water-containing biomass material consists of leaving the biomass material in the reactor vessel under the treatment conditions for two weeks or longer.

2. The method according to claim 1, wherein the maintaining of the water-containing biomass material is continued for three weeks or longer.

3. The method according to claim 1, wherein the biomass material is one material or a mixture of more than one materials selected from the group consisting of a waste biomass material and a plant biomass material.

4. The method according to claim 1, wherein the reactor vessel further comprises a temperature controller for maintaining the biomass material under the treatment conditions.

5. The method according to claim 1, further comprising: preparing the water-containing biomass material, prior to the maintaining of the water-containing biomass material.

6. A treatment method, comprising:
placing a biomass material including water in a container main body of a reactor vessel,
covering with a lid the container main body having an intake port and an exhaust port, and
maintaining the biomass material in the reactor vessel covered with the lid for a period of two weeks or longer such that the biomass material is maintained in an atmosphere including oxygen and at a temperature range of 70° C. or greater and less than 100° C. and that the biomass material is oxidized by the oxygen in the atmosphere in the presence of the water to generate carbon dioxide,
wherein the biomass material includes the water within a range of 40 to 80%, inclusive, at beginning of the maintaining of the biomass material in the reactor vessel, and within a range of 5 to 20%, inclusive, at the end of the maintaining of the biomass material in the reactor vessel,
the water is removed from the biomass material during the maintaining of the biomass material only by natural drying or drying which occurs as a result of the introduction of the atmosphere into the reactor vessel through the intake port and/or the exhaust port, and/or the temperature being maintained in the temperature range, and the maintaining of the biomass material consists of leaving the biomass material in the reactor vessel at the temperature range of 70° C. or greater and less than 100° C. for the period of two weeks or longer.

7. The treatment method according to claim 6, wherein the maintaining of the biomass material is continued for three to twelve weeks.

8. The treatment method according to claim 6, wherein the biomass material comprises at least one of a plant biomass material, food waste, livestock excrement, agricultural waste, marine waste, and forest waste.

9. The treatment method according to claim 6, wherein the reactor vessel has a temperature controller.

10. The treatment method according to claim 6, further comprising:
preparing the biomass material including the water, prior to the placing the biomass material in the reactor vessel.

11. The treatment method according to claim 6, wherein the maintaining of the biomass material is continued for three weeks or longer.

12. The treatment method according to claim 6, wherein the biomass material includes the water within a range of 5 to 10%, inclusive, at the end of the maintaining of the biomass material in the reactor vessel.

13. The treatment method according to claim 6, wherein the water content of the biomass material is gradually reduced to the range of 5 to 20% during the maintaining of the biomass material in the reactor vessel.

14. The treatment method according to claim 6, wherein the water content of the biomass material gradually decreases over the period of two weeks or longer during the maintaining of the biomass material.

15. The treatment method according to claim 6, wherein the water content of the biomass material is gradually reduced to 10% or less a range of 5 to 10%, inclusive, over the period of two weeks or longer during the maintaining of the biomass material in the reactor vessel.

16. The treatment method according to claim 7, wherein the water content of the biomass material is gradually reduced to a range of 5 to 10%, inclusive, over the period of three to twelve weeks during the maintaining of the biomass material in the reactor vessel.

17. The treatment method according to claim 6, wherein the biomass material is placed in the reactor vessel such that the intake port and the exhaust port of the reactor vessel are present above the biomass material.

18. The treatment method according to claim 6, wherein the biomass material is placed in a storage container having an open top, and the storage container is placed in the reactor vessel.

19. The treatment method according to claim 6, wherein the covering includes sealing the lid of the reactor vessel to the container main body, and the biomass material is maintained in the container main body sealed with the lid.

20. The treatment method according to claim 17, wherein the biomass material is placed in a storage container having an open top, and the storage container is placed in the reactor vessel.

* * * * *